J. B. INGALLS.
FINGER RING GAGE.
APPLICATION FILED JULY 25, 1917.
1,277,075.
Patented Aug. 27, 1918.
2 SHEETS—SHEET 1.
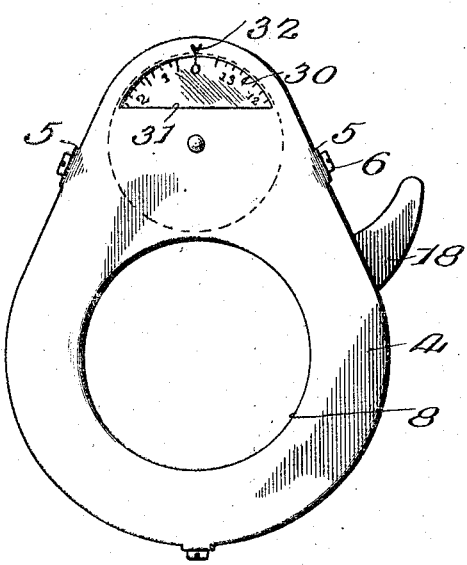
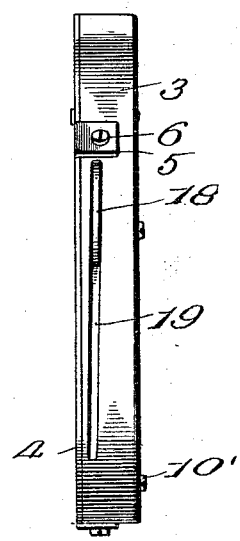
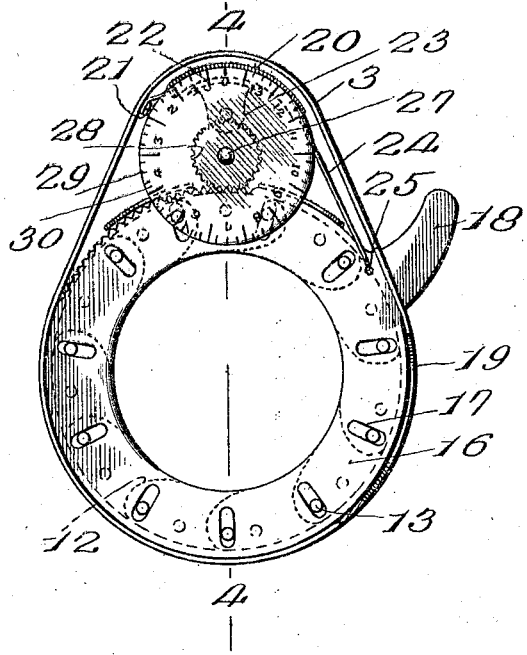
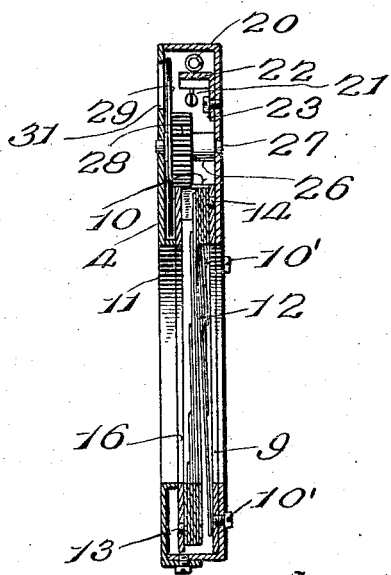
Inventor
J. B. Ingalls,
By
, Attorneys.

J. B. INGALLS.
FINGER RING GAGE.
APPLICATION FILED JULY 25, 1917.
1,277,075.
Patented Aug. 27, 1918.
2 SHEETS—SHEET 2.
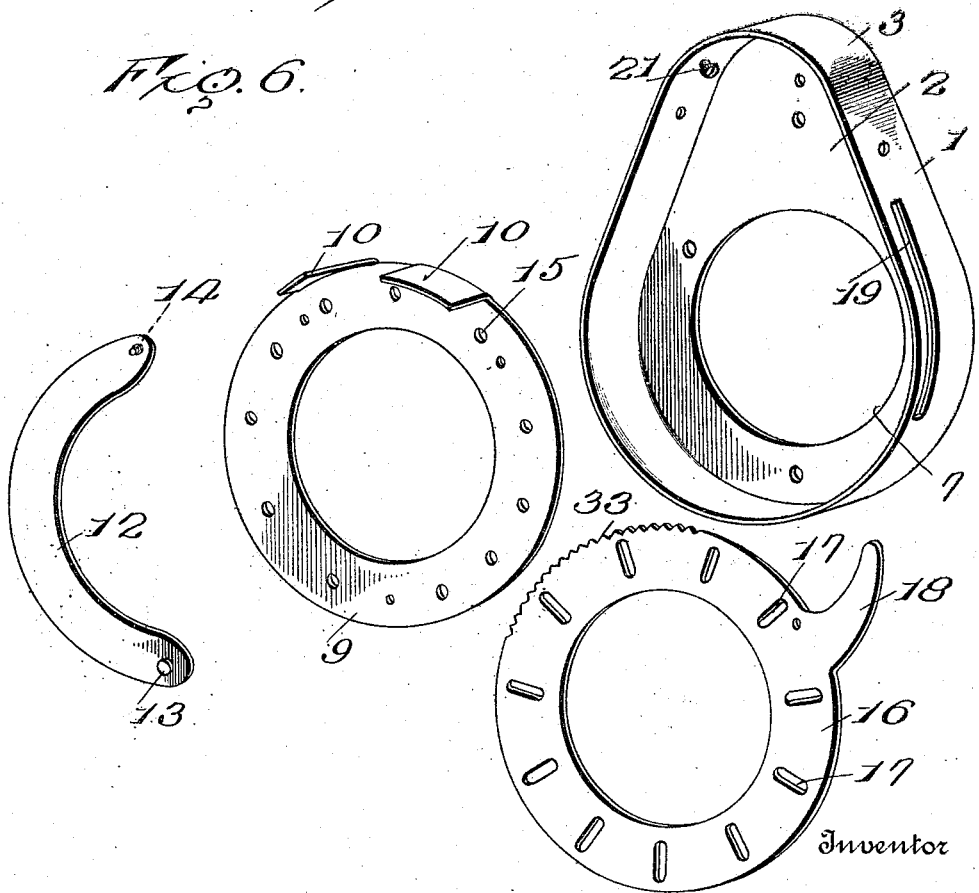

UNITED STATES PATENT OFFICE.

JOSEPH B. INGALLS, OF CHICAGO, ILLINOIS, ASSIGNOR TO HOWARD D. INGALLS, OF CHICAGO, ILLINOIS.

FINGER-RING GAGE.

1,277,075.   Specification of Letters Patent.   Patented Aug. 27, 1918.

Application filed July 25, 1917. Serial No. 182,777.

*To all whom it may concern:*

Be it known that I, JOSEPH B. INGALLS, a citizen of the United States, residing at Chicago, in the county of Cook and State of Illinois, have invented certain new and useful Improvements in Finger-Ring Gages, of which the following is a specification.

This invention relates to finger ring gages and has as its object to provide a gage which may be readily and quickly employed for the purpose of accurately determining the ring measurement of a finger, obviating the employment of the usual bunch of rings of different sizes, several of which ordinarily must be fitted to the finger before the correct size can be determined.

Another aim of the invention is to provide a gage of the class described which will be compact in form and which, in use, may be readily applied to the finger to be gaged, readily operated to indicate the ring measurement, and finally readily disengaged from the finger.

In the accompanying drawings:

Figure 1 is a front elevation of the gage embodying the present invention;

Fig. 2 is a side elevation thereof;

Fig. 3 is a view similar to Fig. 1 but illustrating the cap plate of the casing of the gage removed;

Fig. 4 is a vertical sectional view on the line 4—4 of Fig. 3;

Fig. 5 is a perspective view illustrating the manner of using the gage;

Fig. 6 is a group perspective view illustrating a number of the parts of the gage disassembled.

The mechanism of the gage is housed within a casing which, while it may be of any desired shape, is preferably substantially elliptical in marginal outline. The body of the casing is clearly shown in Fig. 6 of the drawings and is indicated in general by the numeral 1 and the said body includes a face plate 2 which, as stated, is of elliptical marginal outline and is formed at its margin with a continuous flange 3 which projects from the plane of one face of the said plate, this flange constituting the surrounding wall of the casing and the said plate 2 constituting one side of the casing. The other side of the casing is in the nature of a cap plate 4 which at its side and lower edges is provided with ears 5 which are bent to extend from the plane of the inner face of the said cap plate in position overlapping the wall 3 of the body of the casing, securing screws or other similar elements 6 being passed through the said ears 5 and into the said wall 3 for the purpose of securing the cap plate in place upon the body of the casing. Near its lower side and concentric to the lower portions of the sides and the bottom of the wall 3, the plate 2 is formed with a circular opening 7 which opposes and is in axial alinement with a similar opening 8 formed in the cap plate 4, these openings being of a diameter slightly greater than the diameter of the largest standard size of ring. Disposed against the inner face of the plate 2 is an annular bearing plate 9 secured in place by means of screws 10 or other fastening elements fitted through the plate 2 and into openings in the said plate 9. At its upper side and upon its outer periphery of the plate 9 is formed with spaced flanges 10 which are bent to project inwardly from the inner face of the said plate and these flanges serve a purpose which will be presently explained. The opening in the annular plate 9 registers with the opening 7 and is, consequently, in alinement with the opening in the cap plate 4 and the said cap plate 4, upon its inner face and surrounding the opening 8 therein, is formed with a continuous flange 11 which is relatively shallow.

The gage embodying the present invention embodies a gage member comprising a number of sections in the nature of blades 12 which define a finger opening and which sections are relatively adjustable through means to be presently described whereby to increase or decrease the diameter of the finger opening. These blades are arcuate in form and flat and relatively thin, the blades being arranged in an annular series overlapping one another, as clearly shown in Figs. 3 and 4 of the drawings. Each of the blades is provided upon one side and at one end with a stud 13 and upon its opposite side and at its other end with a stud 14. The bearing plate 9 is formed with a number of openings 15 suitably spaced in an annular series and the blades 12 are assembled with this plate by successively disposing the blades in overlapped relation and with their studs 13 engaging pivotally in the openings 15. When thus arranged the studs 14 of the blades will be located in an annular series and presented toward the cap plate of the casing and in the normal positions of the blades the inner edges thereof will touch a circle corresponding in diameter and axially alined with the openings 7 and 8 in the plates 2 and 4, respectively. Considering the ends of the blades which are pivotally connected with the plates 9, as the inner ends, means is provided for moving the outer ends, of the blades simultaneously toward the center of the finger opening of the device whereby to decrease the diameter of the finger opening until the inner edges of the said blades touch and circumscribe the finger to be engaged and this means is in the nature of an annular plate 16 which is formed with an annular series of radial slots 17. This plate 16 is disposed with its outer face seating against the edge of the flange 11 and with its opening registering with the opening described by the said flange, the other or inner face of the plate at the upper side of the plate resting against the edges of the flanges 10. The outer periphery of the plate 16 is arranged to move against the inner face of the lower portion of the wall 3 and the periphery of the plate at the upper side of the plate is arranged to move against the under faces of the flanges 1, the plate being in this manner held and guided for rotary movement. The studs 14 upon the blades 12 fit within the slots 13 in the plate 16 and it will be understood that when this plate is rotated toward the right in Fig. 3 of the drawings, the blades 12 will have their outer ends moved simultaneously so as to move their inner edges inwardly toward the center of the finger opening and thereby decrease the diameter of the said opening as defined by the said edges of the blades. In order that the plate 16 may be rotated for the purpose stated, the said plate is provided with a laterally projecting finger piece 18 which is fitted slidably through a slot 19 formed in the side of the wall 3 of the body of the casing, the finger piece seating normally in the upper end of the slot, as clearly shown in Fig. 2 of the drawings. In order that when the finger piece has been moved downwardly to adjust the diameter of the finger opening defined by the inner edges of the blades 12, and is released, the plate 16 may be automatically returned to its normal position, a spring 20 is connected at one end to a stud 21 located within the body of the casing at one side of the upper end thereof and upon the wall 3 and the said spring, which is of the coil type, is led over an arcuate supporting flange 22 which is formed upon and projects inwardly from a plate 23 secured upon the inner face of the plate 2 near the top thereof, this flange serving to prevent interference of the spring with the indicator mechanism which will be presently described. At its other end the spring is straightened to provide a flexible stem 24 which is connected at its end, as at 25, to the plate 16 near the base of the finger piece 18. It will now be apparent that downward movement of the finger piece and consequent movement of the plate 16 in a clockwise direction will be against the tension of the spring 20 and that the spring will serve to return the plate 16 to normal position when the finger piece has been released.

In order that when the gage is applied to the finger and the finger piece 18 is swung down to bring the inner edges of the blades 12 into contact with the finger with the degree of snugness to which it is desired that the ring shall fit, the ring size may be indicated to the operator of the gage, indicator mechanism is provided which will now be described. The numeral 26 indicates a spindle which is reduced at its ends, as at 27, and rotatably fitted in alined bearing openings in the plates 2 and 4 and integral with or fixed upon this spindle is a pinion 28 and a dial 29 which latter bears upon its face scale marks and numerals 30 indicating various standard ring sizes. The upper portion of the face of the dial is exposed to view through an opening 31 formed in the cap plate, and at the upper side of this opening upon the outer face of the said cap plate there is an indicator mark 32 with which the scale marks 30 are designed to register as the dial 39 is rotated. In order to impart rotary motion to the dial as the plate 16 is rotated the periphery of the said plate at the upper side of the said plate is formed with a series of rack teeth 33 which mesh with the pinion 28.

From the foregoing description of the invention it will be understood that in order to ascertain the ring size of a person's finger it is only necessary to place the gage over the finger and then swing the finger piece 18 in a downward direction until the inner edges of the blades 12 fit about the finger with the desired degree of snugness. The user of the gage will then note the ring size indicated by the registration of the indicator point 32 with the scale marks upon the dial 29 after which the finger piece 18 may be released and as the plate 16 is automatically returned to normal position and the finger opening is thus automatically greatly enlarged, the gage may be immediately removed from the finger.

Having thus described the invention, what is claimed as new is.

1. In a gage of the class described, a relatively fixed member having a finger opening, a plurality of blades each pivotally connected at one end to the said member and arranged in overlapped relation, a rotatable member to which the other ends of the blades are pivotally connected, the adjustment of the said rotatable member serving to adjust the blades to vary the size of the opening, and means actuated by the rotation of the last-mentioned member for indicating variations in the diameter of the opening defined by the said blades.

2. In a gage of the class described, a relatively fixed member having a finger opening, a series of blades each pivotally connected at one end to the said member, the blades normally surrounding the said opening and being adjustable with relation to the opening to increase and decrease the diameter thereof, means for so adjusting the blades, and means actuated by the adjusting means for indicating the variations in the diameter of the finger opening.

3. In a gage of the class described a casing having a finger opening in one wall thereof, and also formed with a slot, segmental blades disposed in overlapping relation upon said wall and each pivotally connected at one end to the wall, a member rotatably mounted within the casing and having pivotal connection with the other ends of the said blades whereby when the member is rotated the last-mentioned ends of the blades will be drawn inwardly whereby to vary the diameter of the opening defined by the inner edges of the blades, a finger piece carried by the last-mentioned member and working through the slot in the said casing, a rotary indicator member bearing a scale, and operative connection between the indicator member and the said rotary member.

4. In a gage of the class described, a casing having a finger opening in one wall thereof, and also formed with a slot, segmental blades disposed in overlapping relation upon said wall and each pivotally connected at one end to the wall, a member rotatably mounted within the casing and having pivotal connection with the other ends of the said blades whereby when the member is rotated the last-mentioned ends of the blades will be drawn inwardly whereby to vary the diameter of the opening defined by the inner edges of the blades, a finger piece carried by the last-mentioned member and working through the slot in the said casing, a rotary indicator member bearing a scale, operative connection between the indicator member and the said rotary member, the engagement of the finger piece in one end of the slot serving to limit the rotation of the rotatable member in one direction, and a spring connected with the said rotatable member and with the casing normally holding the member rotated to such position.

In testimony whereof I affix my signature.

JOSEPH B. INGALLS. [L. S.]

Copies of this patent may be obtained for five cents each, by addressing the "Commissioner of Patents, Washington, D. C."